UNITED STATES PATENT OFFICE.

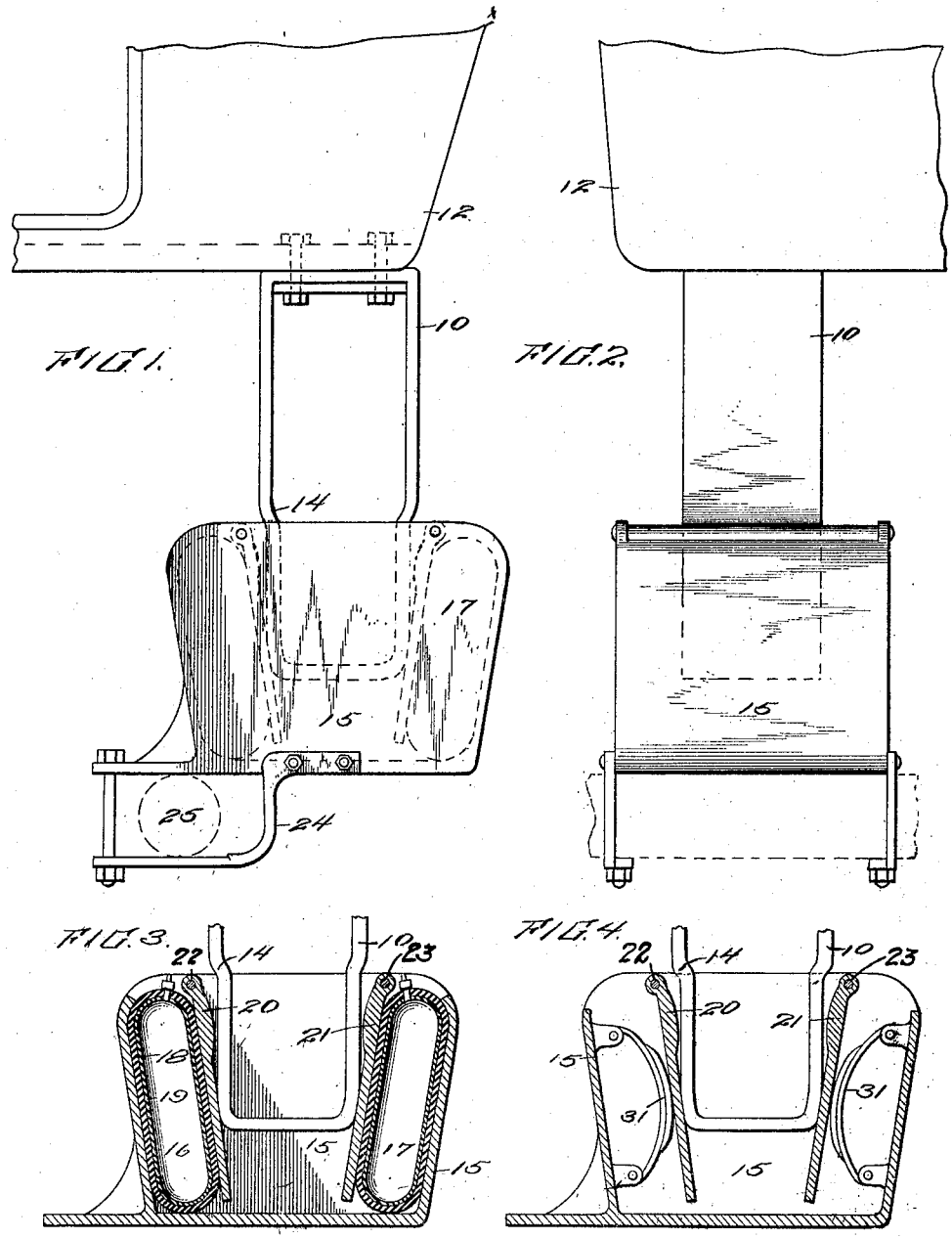

WILLIAM GALT CHIPLEY, OF ATLANTA, GEORGIA.

SHOCK-ABSORBER.

1,121,476.  Specification of Letters Patent.  Patented Dec. 15, 1914.

Application filed January 29, 1914. Serial No. 815,277.

*To all whom it may concern:*

Be it known that I, WILLIAM GALT CHIPLEY, a citizen of the United States, residing at Atlanta, in the county of Fulton and State of Georgia, have invented certain new and useful Improvements in Shock-Absorbers; and I do hereby declare the following to be a full, clear, and exact description of the invention, such as will enable others skilled in the art to which it appertains to make and use the same.

This invention relates to shock absorbers, and one of the chief objects is to provide a device which may be attached to an automobile or other vehicle, or which may be employed wherever shocks are to be reduced or eliminated, and which will be gradually compressed under such conditions that no objectionable rebound following the initial action of the device, will be experienced.

With this and other objects in view the invention consists in the novel construction hereinafter described and claimed.

In the accompanying drawings forming part of this application, Figure 1 is a view of the device in elevation, Fig. 2 is a side elevation, Fig. 3 is a section of the structure described below. Fig. 4 is a section of a modification.

In applying the device to an automobile or other vehicle I employ a frame 10 constituting a plunger which is attached to the body 12, this frame being substantially of U formation, but having if desired an offset or deflected portion 14 in each arm, for the purpose of effecting a particular action in connection with the reverse or return movement of the plunger with reference to the other structure.

A rectangular frame 15 is provided with side walls which may be slightly inclined, and within these walls the cushion members are located. The latter may consist of springs, as in Fig. 4 or of pneumatic devices, as in the other views. When air cushions are employed they may be approximately rectangular in cross section, each with one broad face toward one arm of plunger 10, and the other face against the adjacent side wall of frame 15.

The air cushions are designated 16 and 17 and usually comprise an outer casing 18 and an air receptacle 19, in which the air may be at any desired pressure.

Plates or gate members 20 and 21 are hinged respectively at 22 and 23 at their upper edges and extend across the inner faces of the cushions, being located between the latter and the plunger. These plates take all of the wear off the cushions and provide a proper traveling surface for the plunger. Frame 15 may be supported by a bracket 24 on a structural member 25 of the vehicle.

Particular attention is directed to the extent of surface engaged by the plunger, and the fact that the hinged or pivoted plates 20, 21 are normally inclined so that the absorption of the shock is gradual and unusually effective. The deflected portion 14 tends to prevent undue friction between the plunger and plates, leaving as it does a space not engaged, and permits of prompt release at the end of the stroke, or at the termination of the movement of the elements. The absence of a piston or the like, requiring packing, obviates difficulties arising because of wear.

In Fig. 4 I have shown a modification in which flat springs 31, 31 are employed instead of air cushions. The springs may be employed in heavier types of vehicles, and for heavier work in general; also when it would be inconvenient to keep the pneumatic devices filled.

What I claim is:

1. In a device of the class described, a plurality of resilient devices having their contiguous faces converging downward, plates movably hung at their upper edges and overlying said faces, a plunger adapted to descend between said plates, its sides being substantially upright, and enlargements at the upper portions of said sides, for the purpose set forth.

2. In a device of the class described, a plurality of resilient devices each having a surface forming substantially an inclined plane, a hinged member associated with each resilient device, a plunger, and deflected portions on said plunger arranged to suddenly spread the hinged members at a given point in the stroke of the plunger.

3. In a device of the class described, a plurality of resilient devices oppositely mounted and having a portion of their surface flattened, a movably supported member bearing against each resilient device, a plunger, and deflected portions thereon arranged to suddenly spread said members at a given point in the stroke of the plunger for releasing the latter.

4. In a device of the class described, a plurality of resilient devices oppositely mounted and having a portion of their surface flattened, a pivoted member bearing against each resilient device, and a U-shaped frame having outwardly deflected portions arranged to suddenly spread the pivoted members at a given point in the descent of the frame for releasing the latter.

In testimony whereof I affix my signature in presence of two witnesses.

WILLIAM GALT CHIPLEY.

Witnesses:
 B. H. MOULTON,
 A. C. MCCLELLAN.